March 25, 1958  W. F. TOTTEN  2,827,813
SPRINGY PLATES FOR CLAMPING A SCREW-THREADED WORKPIECE
Filed May 14, 1956
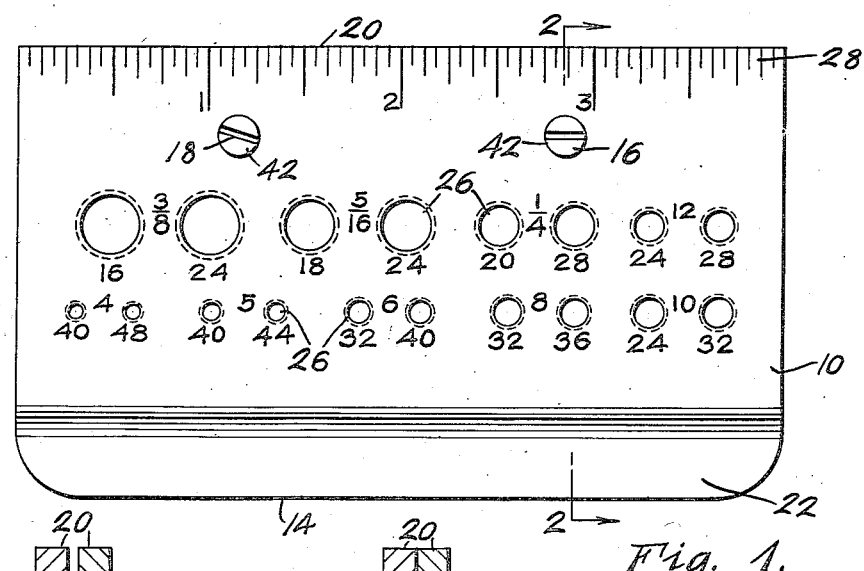
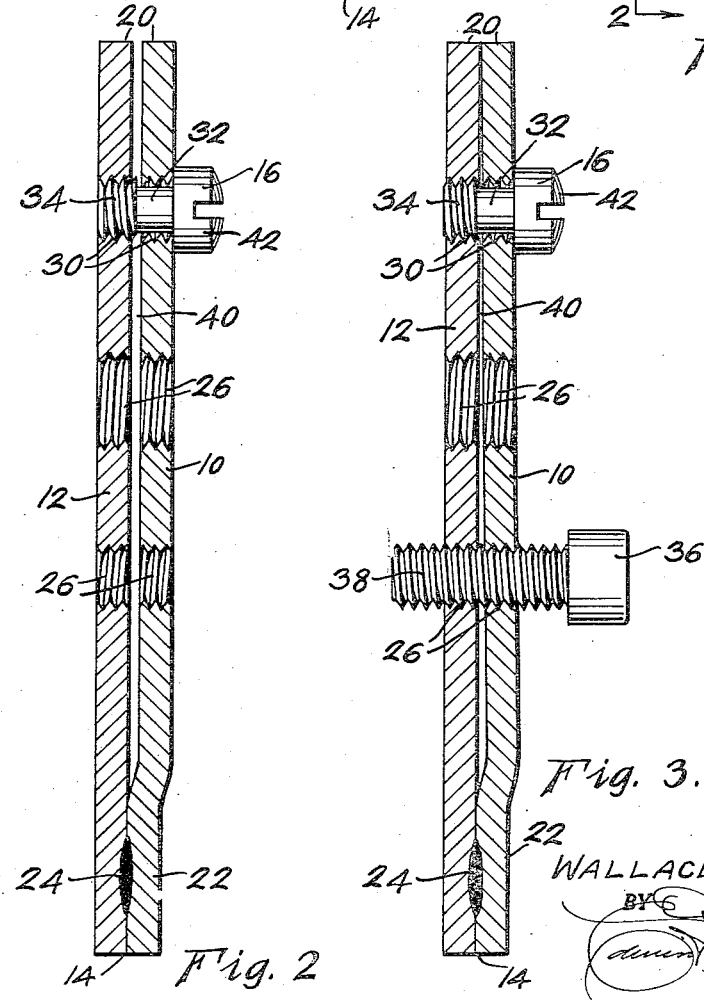
INVENTOR.
WALLACE F. TOTTEN
ATTORNEY

2,827,813
SPRINGY PLATES FOR CLAMPING A SCREW-THREADED WORKPIECE

Wallace F. Totten, Colorado Springs, Colo.

Application May 14, 1956, Serial No. 584,619

6 Claims. (Cl. 81—19)

This invention relates to means for holding a screw while it is being shortened; and more particularly, to a screw plate for this purpose.

It is common practice among machinists, mechanics and the like to purchase their screws in a length which is considerably longer than usually required in their work because the longer screws can be purchased almost as cheaply as the shorter ones. It becomes necessary, therefore, to shorten these screws to the length required for a given job.

These men for many years have found a screw plate a handy tool for holding the screw while it is being shortened. The ordinary screw plate consists merely of a single flat steel plate tapped with a plurality of threaded openings corresponding to the various commonly used screw diameters and thread pitches. The screw to be shortened is inserted into the tapped opening corresponding thereto with the length thereof which is to be cut off projecting through the back of the plate. Thereafter, this projecting portion is cut off with a hack-saw, and the end of the screw is finished with a file.

Screw plates of this type are unsatisfactory and difficult to use, however, as no means is provided for preventing the screw from turning within the threaded opening in the plate while it is being sawed off. The hack-saw contacts the threads of the screw in such a manner that it tends to turn in the plate thus resulting in a burred or otherwise ruined thread.

It is, therefore, the principal object of the present invention to provide a screw plate which is constructed with a novel vise-like action which grips the screw and prevents it turning while being shortened.

Another object of the invention is to provide a screw plate wherein the screw can instantly be gripped or released during the shortening operation.

Additional objects of the invention are to provide a screw plate which is simple, compact, inexpensive and decorative in appearance, and which can also be used as a gauge to determine screw diameters and thread pitches.

Other objects will be in part apparent and in part pointed out specifically hereinafter in connection with the description of the drawing which follows and in which:

Figure 1 is a front elevation of the screw plate of the present invention;

Figure 2 is a section taken along line 2—2 of Figure 1 showing the screw plate in position to receive a screw to be shortened; and, Figure 3 is a section similar to Figure 2 showing the screw plate with a screw gripped therein.

Referring now to the drawing, it will be seen that the screw plate of the present invention comprises front and rear plates 10 and 12, respectively, permanently attached to one another along an edge 14 and provided with two screws 16 and 18 threadedly interconnecting the two plates at spaced points adjacent the opposite edge 20 thereof. The rear plate 12 is flat; whereas, the front plate 10 is formed to provide an offset portion 22 along its lower edge 14. Both the front and rear plates are preferably the same size and shape, a substantially rectangular shape having been illustrated, although many other shapes will function for the purpose intended and in the same manner.

An examination of Figures 2 and 3 will show that with the front and rear plates placed face-to-face and welded together, as shown at 24, along the corresponding lower edges 14 thereof, the offset portion 22 places the plates in spaced, normally parallel relation as shown most clearly in Figure 2. In use, the screw plate of the instant invention is clamped in a vise or the like while a screw is being shortened, the jaws of the vise (not shown) engaging the plates along the lower edge 14. It is important in this connection to note, however, that the plates are gripped in the vise in such a manner that the plates are not forced together. This, of course, is easily accomplished by insuring that the jaws of the vise do not project above the offset portion 22 of the front plate.

After the front and rear plates are assembled, they are tapped to provide threaded openings 26 sized to receive the common screw diameters and thread pitches. In Figure 1 it will be seen, as an example, that two quarter-inch tapped holes 26 are provided in the plates, one with twenty threads to the inch, and the other with twenty-eight. Of course, other quarter-inch holes having a different number of threads to the inch corresponding to other conventional screw sizes can also be used. The same is true of the screw diameters as the screw plate of the present invention can easily be adapted to receive screws of any desired thread-pitch and diameter. The screw plate illustrated in Figure 1 is merely illustrative of one which can be used to receive and hold those screws which are most commonly used by the machinist and hobbyist.

It will also be noted in Figure 1 that a scale 28 is provided along the upper edge 20 of the front plate for convenience in measuring the amount to be removed from the screw being shortened. Obviously the scale provides a handy measuring device for many other purposes around the shop.

One of the most important features of the screw plate will now be described in connection with Figures 2 and 3 of the drawing. Of course, the tapped openings 26 of a given diameter and thread-pitch are arranged coaxially in the front and rear plates, as shown. The holes 26 are tapped, however, with the front and rear plates in spaced parallel relation as will be seen in Figure 2. It is, therefore, only in the spaced parallel position of the plates that the screws to be shortened can be threaded in and out of the tapped openings 26 in the plates. Screws 16 and 18 are threaded into tapped holes 30, one of which is shown, spaced from one another and positioned adjacent the top edge 20 of the plates. In the preferred construction illustrated, screws 16 and 18 are each provided with a neck 32 which is unthreaded for a length approximating the thickness of the front plate 10. This construction of screws 16 and 18 permits the front and rear plates to be drawn together, as shown in Figure 3, without the threads 34 thereof being engaged within the threads of opening 30 in the front plate, which would tend to maintain the plates in fixed spaced relation even though the screws were tightened.

Further in connection with Figure 3, it will be noted that the threaded openings 30 in the plates are tapped with the front and rear plates in the tightened or closed position as shown therein. Thus, the threads within the openings 30 in the front and rear plates are misaligned when the plates are in the normal spaced parallel position of Figure 2 so as to prevent accidental removal and loss of the screws 16 and 18 from the plates. This relation between the threads of the openings 30 is opposite to that of the threads within the openings 26, as has already been described. The normal position of the plates is in spaced parallel relation and this spaced position is maintained by the offset portion 22 of the front plate and the normal spring-action thereof. Also, when the screws 16 and 18 are loosened to free a screw 36 which is being shortened, the front and rear plates are automatically positioned in spaced parallel relation and maintained in this position by the normal spring action of the plate 10.

The screw 36 which is to be shortened is inserted within the tapped opening 26 in the plates which has the diameter and thread corresponding thereto. The screw is threaded first through the front plate and then through the rear plate until a portion 38 which is to be removed projects beyond the rear face of the rear plate. The plates must be in the spaced parallel relation of Figure 2 before the screw can be inserted, as afore-mentioned. Then, the screws 16 and 18 are tightened to close the gap 40 between the plates. A head 42 of the screws 16 and 18 acts to force the front plate against the rear plate when said screws are tightened. This action in tightening the screws 16 and 18 causes the threads within the opening 26 in both of the plates to tighten against the thread of the screw 36, thus locking it against rotation within the threaded openings and permitting the projecting portion 38 thereof to be sawed off without the screw turning relative to the plates. After the projecting portion 38 has been sawed off and filed, it is only necessary to loosen the screws 16 and 18 until the screw 36 becomes freed and can be withdrawn. The screw plate is customarily fastened in a vise in the manner already described while being shortened.

From the foregoing description of the novel and useful screw plate of the present invention it will be seen that the many useful objects for which it was designed have been achieved. Although the invention has been described in connection with the specific form thereof illustrated in the accompanying drawing, it will be apparent to those skilled in the art that many changes can be made therein without departing from the scope of the invention; hence, it is the intention of the inventor that the scope of protection afforded herein be limited only insofar as said limitations are expressly set forth in the appended claims, and therefore, I claim:

1. A device for holding a screw in fixed position while being shortened comprising: two plates attached to one another along one edge in spaced normally parallel relation so as to provide a gap therebetween, said plates each having coaxial threaded openings of the same diameter and thread-pitch arranged, when said plates are in spaced parallel relation to receive therethrough a screw to be shortened; and, means operatively interconnecting the plates for closing the gap therebetween in order to grip a screw that has been threaded into said openings and thus prevent its rotation while being shortened.

2. A device for holding a screw in fixed position while being shortened comprising: two plates attached to one another along one edge in spaced normally parallel relation so as to provide a gap therebetween, said plates having at least one pair of registering threaded openings of the same diameter and thread-pitch, the threads in each pair of openings being arranged to receive a screw when said plates are in spaced substantially parallel relation; and means for closing the gap between the plates in order to grip a screw that has been threaded therein and thus prevent its rotation, said means comprising a clamping screw threadedly interconnecting the plates.

3. A device for holding a screw in fixed nonrotatable position while being shortened comprising: a substantially flat rear plate; a front plate having an offset portion along one edge thereof attached to a corresponding edge of the rear plate, said offset portion forming means for maintaining the front and rear plates in spaced normally parallel relation so as to provide a gap therebetween; said plates containing a plurality of pairs of registering threaded openings, both openings of a pair having the same diameter and the same pitch threads therein, each of said pairs being arranged to threadedly receive a screw therein when said plates are in spaced parallel position; and, means for closing the gap between the plates in order to grip a screw that has been threaded therein and thus prevents its rotation while being shortened, said means comprising at least one clamping screw threadedly interconnecting the plates.

4. A device for holding a screw in fixed nonrotatable position while being shortened comprising: two plates attached to one another along one edge in spaced normally parallel relation so as to provide a gap therebetween, said plates containing at least one pair of registering threaded openings of the same diameter and thread-pitch arranged, when said plates are in spaced parallel relation, to receive a screw to be shortened; said plates containing an additional pair of registering threaded openings of the same diameter and thread-pitch, said additional pair of threaded openings being arranged to receive a clamping screw when the gap between said plates is substantially closed; and a clamping screw threadedly engaged in said additional pair of threaded openings and operable to close the gap between the plates when threaded inwardly thus providing means for gripping a screw that has been threaded into the first-mentioned pair of openings and for preventing its rotation while being shortened.

5. A device in accordance with claim 4, in which the clamping screw that is used to close the gap between the plates is threadedly engaged in only the threaded opening in the rear plate and is provided with an enlarged head that is in contacting relation with the front plate.

6. A device in accordance with claim 5, in which the front and rear plates are fastened together along their lower edges; and in which two clamping screws are used for closing the gap between the plates and are positioned in spaced relation adjacent the top edge of the plates.

References Cited in the file of this patent
UNITED STATES PATENTS

| | | |
|---|---|---|
| 1,208,522 | Duncan | Dec. 12, 1916 |
| 1,895,281 | Currie | Jan. 24, 1933 |
| 2,438,989 | Billman | Apr. 6, 1948 |